United States Patent
Choi et al.

(10) Patent No.: US 12,498,917 B2
(45) Date of Patent: Dec. 16, 2025

(54) VEHICLE NETWORK MANAGEMENT METHOD AND APPARATUS, AND OTA SOFTWARE UPDATE METHOD

(71) Applicants: Hyundai Motor Company, Seoul (KR); Kia Corporation, Seoul (KR)

(72) Inventors: Sung Ho Choi, Hwaseong-si (KR); Juho Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 211 days.

(21) Appl. No.: 18/353,228

(22) Filed: Jul. 17, 2023

(65) Prior Publication Data

US 2024/0192945 A1 Jun. 13, 2024

(30) Foreign Application Priority Data

Dec. 7, 2022 (KR) .................. 10-2022-0169517

(51) Int. Cl.
*G06F 8/65* (2018.01)
*H04L 67/1097* (2022.01)

(52) U.S. Cl.
CPC ............ *G06F 8/65* (2013.01); *H04L 67/1097* (2013.01)

(58) Field of Classification Search
CPC ....... G06F 8/65; H04L 67/1097; H04L 67/12; H04L 67/34; H04L 41/0893; H04L 67/306

See application file for complete search history.

(56) References Cited

U.S. PATENT DOCUMENTS

| | | | |
|---|---|---|---|
| 2005/0232301 A1* | 10/2005 | Lee | H04L 41/12 370/464 |
| 2017/0279971 A1* | 9/2017 | Raleigh | H04W 60/06 |
| 2019/0158353 A1* | 5/2019 | Johnson | H04L 63/0823 |
| 2020/0274927 A1* | 8/2020 | Richmond | H04L 41/0843 |
| 2021/0191708 A1* | 6/2021 | Yang | G06F 8/65 |
| 2022/0173978 A1* | 6/2022 | Metaxas | H04L 41/14 |

FOREIGN PATENT DOCUMENTS

| | | | |
|---|---|---|---|
| JP | 2024041473 A | * | 3/2024 |
| KR | 20200129921 A | * | 5/2019 |
| KR | 2023045932 A | * | 4/2023 |

* cited by examiner

*Primary Examiner* — Daxin Wu
(74) *Attorney, Agent, or Firm* — Slater Matsil, LLP

(57) ABSTRACT

An embodiment method for managing at least one vehicle network including at least one electronic control unit (ECU) among a plurality of ECUs in a vehicle network management apparatus is provided, which may include, based on information of at least one default partial network cluster including at least one ECU among the plurality of ECUs according to at least one default partial network function provided by default in a mapping database, configuring a new partial network cluster by adding an ECU according to user customization to the at least one default partial network cluster, and storing information of the new partial network cluster in the mapping database.

20 Claims, 11 Drawing Sheets

VEHICLE NETWORK MANAGEMENT METHOD AND APPARATUS, AND OTA SOFTWARE UPDATE METHOD

CROSS-REFERENCE TO RELATED APPLICATIONS

The present application claims priority to Korean Patent Application No. 10-2022-0169517 filed on Dec. 7, 2022, the entire contents of which is incorporated herein for all purposes by this reference.

TECHNICAL FIELD

The present disclosure relates to a vehicle network management method and apparatus.

BACKGROUND

In the automotive industry, the paradigm is shifting from internal combustion engine-oriented vehicle development to electrification-oriented electric vehicle (EV) development, and as the development direction shifts to carbon neutralization, autonomous driving, and connectivity, the number of electronic control devices, that is, electronic control units (ECUs), is increasing rapidly. This means an increase in power demand due to an increase in current consumption of loads in the vehicle, and in the case of an EV in particular, it means that it is closely related to vehicle power consumption efficiency.

Accordingly, the need for energy saving and efficient energy management of vehicles is recognized and continuous research and development are being performed.

Network management (NM) has been introduced to maximize the efficiency of vehicle power use. NM is for managing inter-vehicle nodes (ECUs) in a vehicle, and it is used to extend the driving distance in an EV architecture unlike the power architecture of an existing internal combustion engine.

NM is mainly used in systems affected by events such as body convenience devices, multimedia devices, and infotainment. NM uses the network only when a specific function of the vehicle is used by using state transitions between network wake-up, network active, and network sleep, and switches to a low power mode when the function ends.

In the existing OSEK NM, an in-vehicle node (ECU) receives all NM messages including messages irrelevant to itself. Therefore, when an NM message is transmitted through the CAN bus, all nodes connected to the CAN bus topology wake up and consume current. In other words, since the existing OSEK NM uses a batch wake-up/sleep method, it is far from energy saving and efficient energy management of the vehicle.

Meanwhile, unlike the batch wake-up method, a new method called partial networking (PN) has been proposed through selective wake-up. If wakeup/sleep control is selectively performed for a node by applying PN, it is possible to reduce power consumption as well as reduce a communication bus load and a CPU load.

Currently, almost all automotive original equipment manufacturers (OEMs) are applying feature on demand (FoD) through over-the-air (OTA) technology after the vehicle sales, allowing customers to download and activate new features or activate and use software-locked features at an additional cost.

Utilizing the aforementioned PN function, it is possible to promote efficiency such as extending the driving distance or reducing the charging time by reducing the battery energy of the EV. However, in the current structure, this PN effect can be applied only to nodes corresponding to the PN cluster group configured in advance before vehicle sales.

When a new function is added to the existing system in the vehicle through FoD, or when a change in the PN configuration is required due to a function change, or when the customer's use case is expanded according to the application of additional functions, restrictions on use may occur due to the existing PN cluster mapping restrictions.

The information included in this Background of the present disclosure is only for enhancement of understanding of the general background of the present disclosure and may not be taken as an acknowledgement or any form of suggestion that this information forms the prior art already known to a person skilled in the art.

SUMMARY

The present disclosure relates to a vehicle network management method and apparatus. Particular embodiments relate to an OTA software update method. Particular embodiments relate to a vehicle network management method and apparatus for efficient energy management through partial networking.

Various embodiments of the present disclosure are directed to providing a vehicle network management method and apparatus, and an OTA software update method that may efficiently reduce energy consumption through selective wake-up and maximize user convenience.

According to an embodiment of the present disclosure, a method for managing at least one vehicle network including least one electronic control unit (ECU) among a plurality of ECUs in a vehicle network management apparatus is provided. The method embodiment includes, based on information of at least one default partial network (PN) cluster including at least one ECU among the plurality of ECUs according to at least one default PN function provided by default in a mapping database (DB), configuring a new PN cluster by adding an ECU according to user customization to the at least one default PN cluster, and storing information of the new PN cluster in the mapping DB.

The method may further include requesting a change in the PN cluster setting of ECUs included in the new PN cluster through an over-the-air (OTA) software update of an OTA server.

The storing information of the new PN cluster in the mapping DB may include storing the information of the new PN cluster in address location allocated as reserve in a memory area of the mapping DB. The requesting may include requesting a change in the PN cluster setting through data detection at the address location allocated as a reserve.

The configuring may include receiving, from a user, information on a default PN function to be changed among the at least one default PN function. The configuring may include receiving information on a new function to be added from the user. And, the configuring may include configuring the new PN cluster by adding an ECU designated for the new function to be added to the PN cluster for the default PN function to be changed.

The configuring may include generating a new PN function recommendation list including at least one new PN function and recommending the new PN function to a user. The configuring may include receiving information on a new PN function selected from the new PN function recommendation list from the user. And, the configuring may include configuring the new PN cluster based on the information of the new PN function.

The recommending the new PN function may include extracting a new PN function optimized for the user using a user pattern analysis result through big data analysis, and adding the new PN function optimized for the user to the new PN function recommendation list.

The recommending the new PN function may include extracting at least one new PN function having a high preference weighting using an analysis result of configuration information of new PN clusters according to user customization of a plurality of users, and adding the at least one new PN function having a high preference weighting to the new PN function recommendation list.

A method embodiment may further include deactivating at least one of the default PN clusters included in the new PN cluster.

According to another embodiment of the present disclosure, a vehicle network management apparatus for managing at least one vehicle network including at least one electronic control unit (ECU) among a plurality of ECUs in a vehicle is provided. The vehicle network management apparatus may include a mapping database (DB) that stores information of at least one default partial network (PN) cluster including at least one ECU among the plurality of ECUs according to at least one default PN function provided by default. The vehicle network management apparatus may include a partial network cluster (PNC) manager that is configured to create a new PN cluster by adding an ECU according to user customization to the at least one default PN cluster, and to store information of the new PN cluster in the mapping DB.

The PNC manager may be configured to request a PN cluster setting change of ECUs included in the new PN cluster through an OTA software update from an over-the-air (OTA) server.

The PNC manager may be configured to receive information on a default PN function to be changed from a user among the at least one default PN function and information on a new function to be added from the user, and to configure the new PN cluster by adding an ECU for the new function to the PN cluster for the default PN function.

The PNC manager may be configured to generate a new PN function recommendation list including at least one new PN function, to provide it to a user, and to configure the new PN cluster based on information on a new PN function selected by the user.

The PNC manager may be configured to extract a new PN function optimized for the user using a user pattern analysis result through big data analysis, and to add the new PN function optimized for the user to the new PN function recommendation list.

The PNC manager may be configured to extract at least one new PN function having a high preference weighting using an analysis result of configuration information of new PN clusters according to user customization of a plurality of users, and to add the at least one new PN function having the high preference weighting to the new PN function recommendation list.

The PNC manager may be configured to deactivate a default PN cluster included in the new PN cluster.

According to various embodiments of the present disclosure, a method for performing an over-the-air (OTA) software update in at least one electronic control unit (ECU) among a plurality of ECUs in a vehicle is provided. The method may include receiving a PN cluster setting change request of ECUs included in the new PN cluster through an OTA server in response to a new PN cluster according to user customization is configured in addition to at least one default PN cluster provided by default. The method may include updating the PN cluster setting with information of the new PN cluster in a network management (NM) function module based on the PN cluster setting change request.

The method may further include setting communication operating conditions of the new PN cluster in an ECU set as a master of the new PN cluster, and transmitting a wake-up NM message from the ECU set as the master in response to the communication operating conditions being satisfied.

The method may further include receiving the wake-up NM message in the plurality of ECUs, and waking up only the ECU associated with the new PN cluster, based on the information of the new PN cluster included in the wake-up NM message and the PN cluster setting information in the NM function module of each ECU, among the plurality of ECUs that have received the wake-up NM message.

According to the embodiment of the present disclosure, because selective wake-up of ECUs is possible through PN technology of the NM, power loss may be reduced. This leads to the remaining energy of the EV battery, increasing the driving distance compared to the previous one, and shortening the charging time because only the ECUs involved in charging are activated even during charging.

In addition, it is possible to configure a user-customized new PN cluster through selection of function options by the user or providing a recommended PN function through the user pattern analysis. As a result, user convenience may be maximized, and if additional energy saving solutions are developed even after vehicle sales, the optimal energy solution may be provided at any time by changing the user's option or updating the recommended PN function. The methods and apparatuses of embodiments of the present disclosure may have other features and advantages which may be apparent from or are set forth in more detail in the accompanying drawings, which are incorporated herein, and the following Detailed Description, which together serve to explain certain principles of embodiments of the present disclosure.

DETAILED DESCRIPTION OF ILLUSTRATIVE EMBODIMENTS

Figure 1:
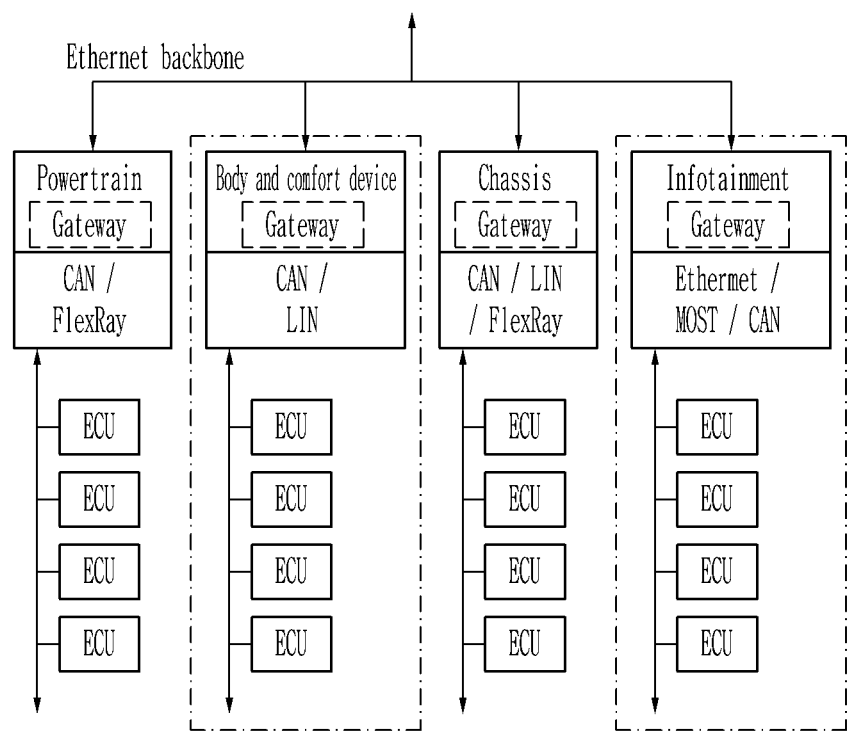
FIG. 1 is a diagram illustrating a general in-vehicle network.

Hereinafter, embodiments of the present disclosure will be described in detail with reference to the appended drawings so that a person of ordinary skill in the art may easily implement the present disclosure. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Throughout the specification, when an element is referred to be "connected" with another element, it includes not only the case where two elements are "directly connected" but also the case where two elements are "electrically or mechanically connected" with another component interposed therebetween.

In the present specification and claims, terms including an ordinal number, such as first, second, etc., may be used to describe various elements, but the elements are not limited by the terms. The above terms are used only for distinguishing one element from another element. For example, without departing from the scope of the present disclosure, a first element may be referred to as a second element, and similarly, a second element may be referred to as a first element.

In a flowchart described with reference to the drawings in the present specification, the order of operations may be changed, several operations may be merged, some operations may be divided, and specific operations may not be performed.

Furthermore, in the present specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a vehicle network management method and apparatus, and an OTA software update method according to embodiments of the present disclosure will be described in detail with reference to drawings.

FIG. 1 is a diagram illustrating a general in-vehicle network for an embodiment.

Referring to FIG. 1, the electronic control unit (ECU)-based electrical parts in a vehicle may be roughly divided into domains such as powertrain, body and comfort devices, chassis, and infotainment, and different networks such as controller area network (CAN), FlexRay, media oriented systems transport (MOST), local interconnect network (LIN), and Ethernet may be used depending on the domain.

Each domain may include a plurality of ECUs according to its functions and roles, and one ECU may be redundantly connected to multiple networks.

In-vehicle ECUs exchange information in different networks, and each domain may include a gateway. The gateway connects one network to another network. A network in each of a plurality of domains may transmit data to a gateway of another network using a different protocol using a gateway of each domain. Each of the plurality of domains may be connected to each other through an Ethernet backbone.

Each domain may be connected to an external server (e.g., a diagnosis server) through the Ethernet backbone, and an upper gateway for connection with the external server may exist.

As the autonomous driving and connectivity of vehicles are strengthened, the number of ECUs increases, and power consumption increases. Accordingly, as a method for minimizing power consumption, a partial network (PN) technology has been introduced. PN is a detailed technology of network management (NM). In general NM, all ECUs on the network wake up in batches, whereas in PN, ECUs on the network can be selectively woken up.

The PN can activate selective group of ECUs to perform a PN function (service) according to a specific PN scenario. The selective group of ECUs is called a PN cluster.

Figure 2:
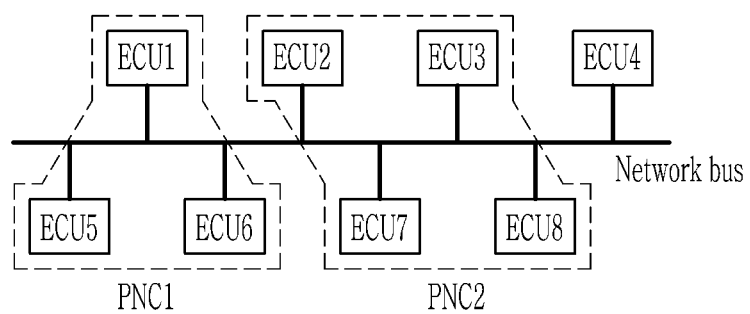
FIG. 2 is a diagram illustrating an example of a PN cluster.

FIG. 2 is a diagram illustrating an example of a PN cluster for an embodiment.

Referring to FIG. 2, ECUs on the network may be grouped according to specific PN function to form a PN cluster. For example, according to a specific PN function, ECU1, ECU5, and ECU6 may be grouped to form a PN cluster (PNC 1), and ECU2, ECU3, ECU7, and ECU8 may be grouped to form a PN cluster (PNC 2).

In addition, ECUs connected through different network buses may form one PN cluster.

Information on the grouped PN clusters is stored in the PNC mapping DB of the vehicle network management apparatus that handles the PN.

The specific PN function is activated or deactivated based on external events or periodic activation.

When the specific PN function is activated and it is necessary to activate the ECUs in the PN cluster, a wake-up NM message is transmitted periodically on the network bus. On the other hand, if there is no need to activate the ECUs in the specific PN function, the wake-up NM message is no longer transmitted.

In this way, in the PN, by grouping the ECUs according to the PN function, unlike in the NM, only ECUs desired/required/designated to perform the corresponding PN function may be woken up. Accordingly, when the PN function is used, it is possible to promote efficiency such as extending the driving distance or reducing the charging time by reducing the battery energy usage of the vehicle.

However, in the current structure, these PN effect may be applied only to ECUs corresponding to a default PN cluster that is configured in advance and provided by default before vehicle sales.

Currently, almost all automotive OEMs are applying feature on demand (FoD), in which customers download and activate new features or activate and use software-locked features by paying an additional fee through over-the-air (OTA) after vehicle sales. When a new function is added to the existing system in the vehicle through FoD, when a change in the PN configuration is desired/required due to a function change, or when the customer's use case is expanded according to the application of additional functions, restrictions on use may occur due to the existing PN cluster mapping restrictions.

Figure 3:
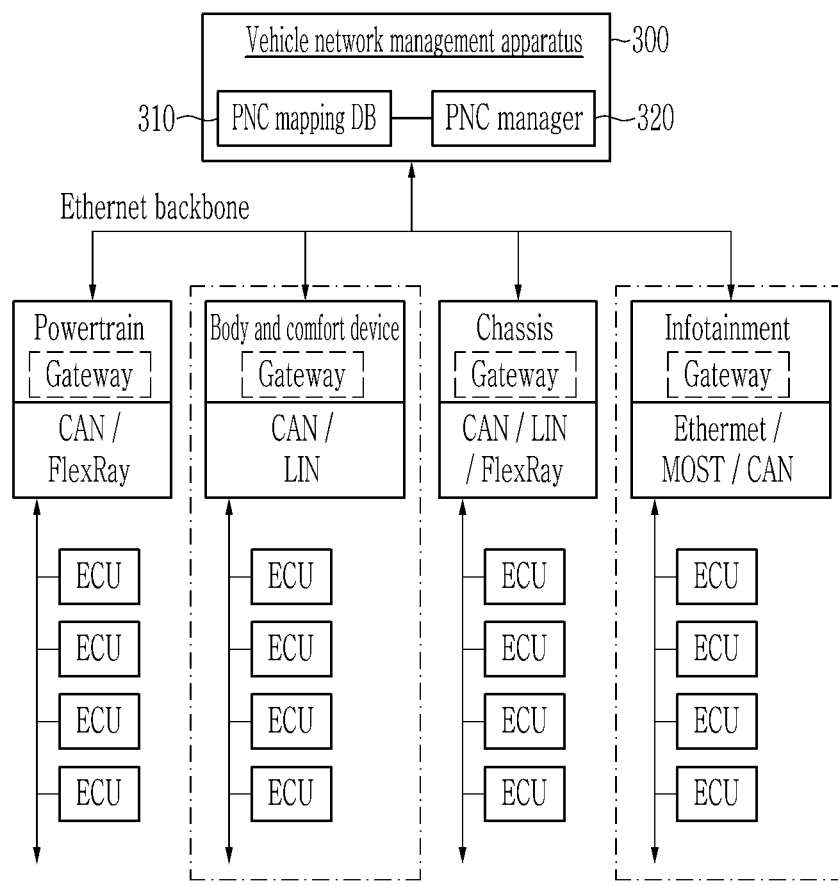
FIG. 3 is a diagram illustrating a vehicle network management apparatus according to an embodiment.

FIG. 3 is a diagram illustrating a vehicle network management apparatus according to an embodiment.

Referring to FIG. 3, the vehicle network management apparatus 300 includes a PNC mapping DB 310 and a PNC manager 320. The vehicle network management apparatus

300 may be implemented in the upper gateway of the Ethernet backbone shown in FIG. 1.

In the PNC mapping DB 310, information of PN clusters (PNC x) according to specific PN functions is stored. The information of the PN clusters (PNC x) may include information of ECUs included in each PN cluster (PNC x).

The PNC manager 320 manages the PN cluster. The PNC manager 320 may perform PN cluster updates such as generation, change, and deletion of PN clusters. The PNC manager 320 may configure a new PN cluster by adding ECUs necessary for additional functions according to customization to a default PN cluster. Configuration of the new PN cluster may mean modification of the default PN cluster. The PNC manager 320 stores information on the new PN cluster in the PNC mapping DB 310. The new PN cluster stored in the PNC mapping DB 310 may be called a PN cluster, and may be distinguished from the default PN cluster.

The PNC manager 320 may delete PN clusters of functions that are unused for a certain period of time.

For example, it is assumed that the battery management system (BMS), low voltage DC converter (LDC), power-net domain controller (PDC), and vehicle control unit (VCU) that are stored in the PNC mapping DB 310, as a default PN cluster PNC1, for reserved charging scenarios while the vehicle is stopped. In this case, if only the four ECUs included in the default PN cluster PNC1 are woken up, reserved charging is possible at the time set by the user while the vehicle is stopped. At this time, in car camping, the user may want to use an air conditioner or heater while sleeping in the vehicle to avoid heat or cold while charging. In this case, it is impossible to implement this function with the current configuration of the PN cluster PNC1, for example.

With the configuration of the current PN cluster PNC1, it is necessary to select a method of operating a full automatic temperature control (FATC) device, which is an air conditioning controller, while performing charging after waking up all ECUs as before applying PN. However, it is disadvantageous in terms of energy saving, charging time, and billing system.

According to an embodiment of the present disclosure, the PNC manager 320 may configure a new PN cluster by adding an FATC device for necessary convenience functions set by the user to the existing PN cluster PNC1. In this way, even when camping, user convenience may be improved by performing charging and at the same time waking up the ECU for necessary convenience functions selected by the user.

The configuration of the PN cluster according to the customization of the PNC manager 320 may be implemented in two ways. The first method is a method of configuring a PN cluster through user settings, and the second method is to recommend a new PN cluster optimized for the user or a new PN cluster with high preference to the user by using the big data analysis results for each user or the analysis results of the PN cluster configured for each user in the first method. The PN cluster configuration of the PNC manager 320 according to such customization will be described later with reference to FIGS. 5 and 9.

The PNC manager 320 may set communication operating conditions of the new PN cluster. The communication operating condition may be, for example, a condition when a user executes a function command implemented through a new PN cluster in a state in which an ignition key is turned off.

Also, when configuring a new PN cluster, the PNC manager 320 may set one ECU among ECUs included in the new PN cluster as a master. When the master is set, the communication operation conditions of the new PN cluster may be set by the ECU corresponding to the master.

The PNC manager 320 may be one or more microprocessors operated by programs and/or hardware including the microprocessors. At this time, the programs may include a series of instructions for performing the vehicle network management method including the functions of the PNC manager 320.

Figure 4:
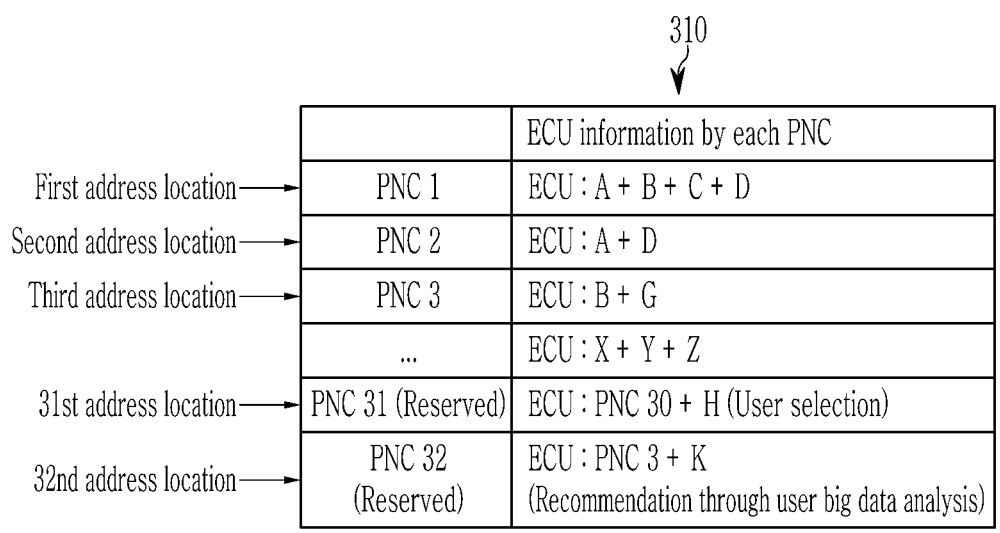
FIG. 4 is a diagram illustrating the PNC mapping DB shown in FIG. 3.

FIG. 4 is a diagram illustrating the PNC mapping DB shown in FIG. 3.

Referring to FIG. 4, information of the default PN cluster may be stored in each address location of the memory area in the PNC mapping DB 310.

In this example, the default PN clusters PNC 1 to PNC 30 correspond to PN functions according to the default PN scenarios, and may be stored in the first to 30th address locations of the memory area in the PNC mapping DB 310, respectively.

The new PN clusters PNC 31 and PNC 32 may correspond to new PN functions according to new PN scenarios in which new functions according to user customization may be added to the default PN clusters, and may be stored in the 31st and 32nd address locations allocated as reserves in the memory area of the PNC mapping DB 310, respectively. That is, the 31st and 32nd address locations may represent reserved areas for future expansion.

Specifically, the PNC manager 320 may configure a new PN cluster PNC 31 by adding an ECU H for a new function according to user selection to the default PN cluster, e.g. PNC 30. At this time, it is assumed that the PN clusters PNC 1 to PNC 30 are mapped from the 1st to the 30th address locations in the memory area of the PNC mapping DB 310, and the 31st and 32nd address locations are empty as reserved areas. Then, the PNC manager 320 may store the new PN cluster PNC 31 in the 31st address location.

In addition, the PNC manager 320 may generate a new PN cluster PNC 32 in which ECU K is added to the default PN cluster, e.g. PNC 3, for a new PN function scenario selected by the user through a new PN cluster recommendation function, and may store the new PN cluster PNC 32 at the 32nd address location.

When data is stored in the empty address location of the reserved area, the PNC manager 320 determines that there is newly added new PN cluster information, and may request an OTA software update to the OTA server (not shown in drawing) for updating the PN cluster of the ECUs included in the new PN cluster.

Figure 5:
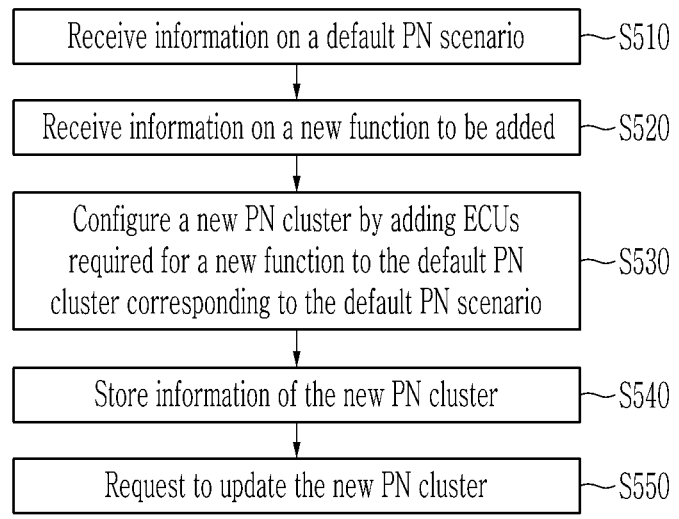
FIG. 5 is a flowchart illustrating a method of configuring a PN cluster using user customization according to an embodiment.

FIG. 5 is a flowchart illustrating a method of configuring a PN cluster using user customization according to an embodiment.

Referring to FIG. 5, a user accesses a basically provided default PN scenarios through audio video navigation (AVN), a user setting menu (USM), or a mobile application.

The user selects a default PN scenario to be changed, and selects a new function to be added to the selected default PN scenario.

The PNC manager 320 receives information on a default PN scenario to be changed from the user (S510).

The PNC manager 320 receives information on a new function that the user wants to add (S520).

The PNC manager 320 configures a new PN cluster by adding ECUs desired/required/designated for a new function to the default PN cluster corresponding to the default PN function according to the default PN scenario (S530).

In this way, the PNC manager 320 may configure a new PN cluster by adding only the ECUs additionally desired/required/designated by the user to the default PN cluster according to the default PN function that needs to be changed. At this time, the PNC manager may deactivate the default PN cluster so that a conflict between the operation of the PN cluster for the default PN function that needs to be changed and the operation of the new PN cluster does not occur.

For example, the PNC manager 320 may generate a new PN cluster PNC 31 by adding an ECU for a new function to the PN cluster PNC 1 according to the default PN function. The functional operation of the PN cluster PNC 1 may be replaced by the functional operation of the PN cluster PNC 31 through the activation of the PN cluster PNC 31, so the PN cluster PNC 1 may be deactivated. Accordingly, a collision with the operation of the new PN cluster (PNC 31) may be prevented from occurring.

The PNC manager 320 stores information of the new PN cluster (S540).

The PNC manager 320 requests the ECUs included in the new PN cluster to update the new PN cluster (S550).

Figure 6:
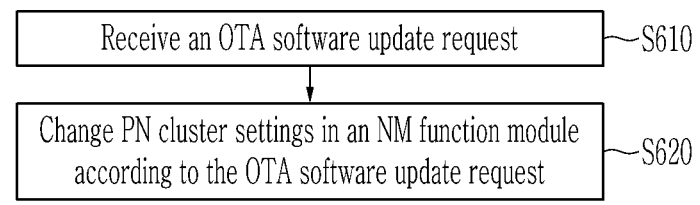
FIG. 6 is a flowchart illustrating an update method embodiment according to a PN cluster update request of an ECU included in a new PN cluster.

FIG. 6 is a flowchart illustrating an update method embodiment according to a PN cluster update request of an ECU included in a new PN cluster.

Referring to FIG. 6, when a new PN cluster is generated, the PNC manager 320 may request an OTA software update for the new PN cluster from the ECUs included in the new PN cluster. The OTA software update request is transmitted to the OTA server, and the OTA server transmits the OTA software update request to the ECUs included in the new PN cluster. The OTA software update request may include information of the new PN cluster.

OTA software update of the user vehicle is performed according to the OTA software update request.

In the user vehicle, the ECUs included in the new PN cluster receive an OTA software update request from the OTA server (S610).

The ECUs included in the new PN cluster changes PN cluster settings in an NM function module according to the OTA software update request (S620).

In this way, by changing the PNC setting in the NM function module, the ECUs included in the new PN cluster may wake up and provide the corresponding PN function when the user executes the corresponding PN function command.

Figure 7:
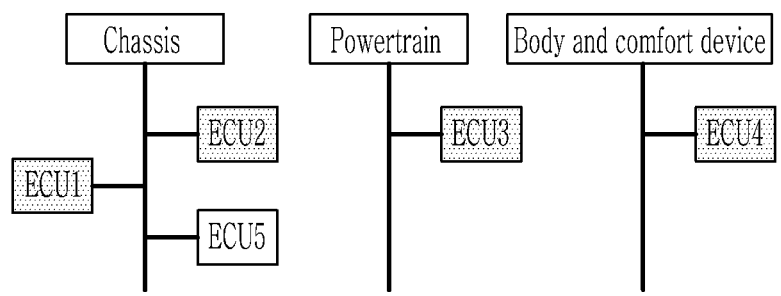
FIG. 7 is a diagram illustrating an example of a new PN cluster configured by the PNC manager shown in FIG. 3.
Figure 8:
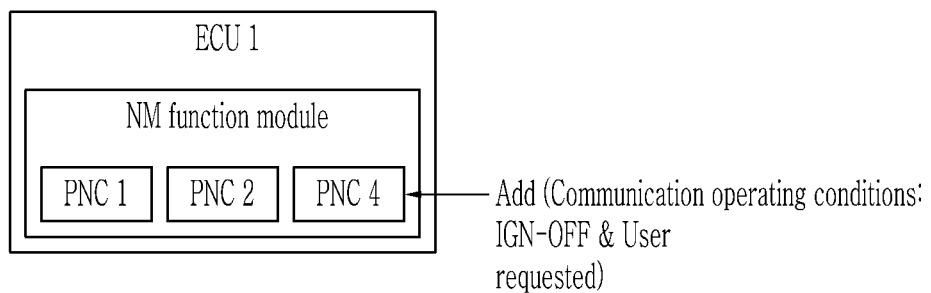
FIG. 8 is a diagram illustrating an embodiment for OTA software update of an ECU included in a new PN cluster.

FIG. 7 is a diagram illustrating an example of a new PN cluster configured by the PNC manager shown in FIG. 3, and FIG. 8 is a diagram illustrating an OTA software update of an ECU included in a new PN cluster in an embodiment.

As shown in FIG. 7, it is assumed that a new PN cluster PNC 4 includes ECU1 and ECU2 in the chassis domain, ECU3 in the powertrain domain, and ECU4 in the body domain.

As shown in FIG. 8, ECU 1 included in the new PN cluster in the user vehicle sets information of the new PN cluster PNC 4 in the NM function module according to the OTA software update request. At this time, the PN clusters PNC 1 and PNC 2 may be default PN clusters in the NM function module.

Meanwhile, when ECU1 among the ECUs included in the new PN cluster PNC 4 is set as a master, ECU1 may set a communication operating conditions of the corresponding PN cluster PNC 4.

In FIG. 7, only the OTA software update of ECU1 is shown for convenience of explanation, but the remaining ECU2, ECU3, and ECU4 included in the PN cluster PNC 4 also set information of the new PN cluster PNC 4 in the NM function module according to the OTA software update request, in the same way as ECU1.

Figure 9:
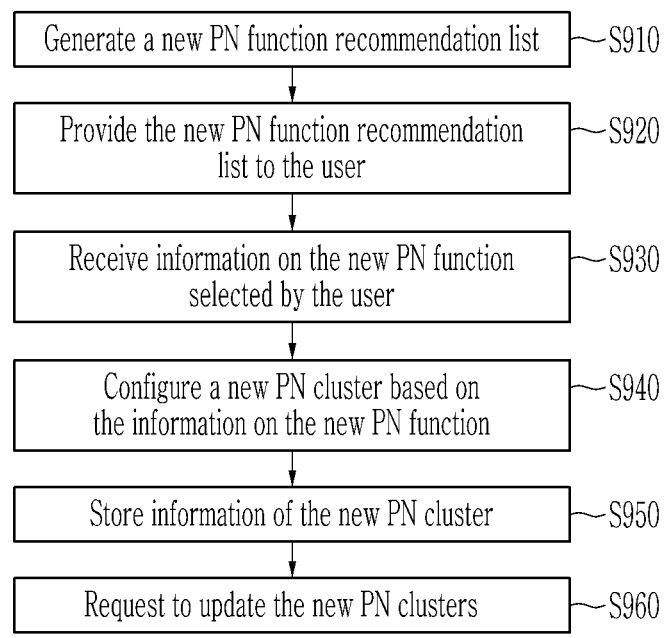
FIG. 9 is a flowchart illustrating a method of configuring a PN cluster using user customization according to another embodiment.

FIG. 9 is a flowchart illustrating a method of configuring a PN cluster using user customization according to another embodiment.

In the method of configuring the PN cluster shown in FIG. 9, unlike the user selection of FIG. 5, the PNC manager 320 recommends new PN functions with high preference to the user.

Referring to FIG. 9, the PNC manager 320 generates a new PN function recommendation list including new PN functions optimized for the user and/or new PN functions with high preference (S910), and provides the new PN function recommendation list to the user (S920). The PNC manager 320 may generate the new PN function recommendation list by using the user pattern analysis result, such as the user's driving pattern, or the analysis result of the PN cluster configuration for each user through the method shown in FIG. 5.

For example, when BMS, the LDC, PDC, and VCU are included in the default PN cluster PNC1, for reserved charging scenarios while the vehicle is stopped as exemplified above, if only 4 ECUs included in the default PN cluster PNC1 are woken up, reserved charging is possible at the time set by the user while the vehicle is stopped.

At this time, for example, the PNC manager 320 includes a new PN function in which the function of the air conditioning system is added to the reserved charging scenario in the new PN function recommendation list, based on user pattern analysis results such as information that users often go camping, the frequency of turning on the air conditioning system after stopping the vehicle, and the PN cluster combination that is most utilized by users. Then, the PNC manager 320 may recommend the new PN function to the user by providing the user with the new PN function recommendation list.

The user checks the new PN function recommendation list through the AVN or mobile application, and selects a desired new PN function from the new PN function recommendation list.

The PNC manager 320 receives information on the new PN function selected by the user (S930).

The PNC manager 320 configures a new PN cluster based on the information of the new PN function (S940). For example, the PNC manager 320 may configure a new PN cluster by adding an FATC device to the reserved charging scenario.

The PNC manager 320 stores information of the new PN cluster (S950).

The PNC manager 320 deactivates the default PN cluster included in the new PN cluster, that is, the default PN cluster overlapping with the new PN cluster, thereby preventing a collision of the same operation.

The PNC manager 320 requests the ECUs included in the new PN cluster to update the new PN cluster (S960).

ECUs included in the new PN cluster in the user vehicle receive an OTA software update request through the OTA server, and change the PN cluster settings in the NM function module based on the information of the new PN cluster, as described with reference to FIG. 6.

After the OTA update of the user vehicle is completed according to the OTA update request, when a function command according to a specific PN scenario is executed and the communication operation condition of the PN cluster is satisfied, the corresponding PN cluster is activated and the function according to the specific PN scenario is provided.

Figure 10:
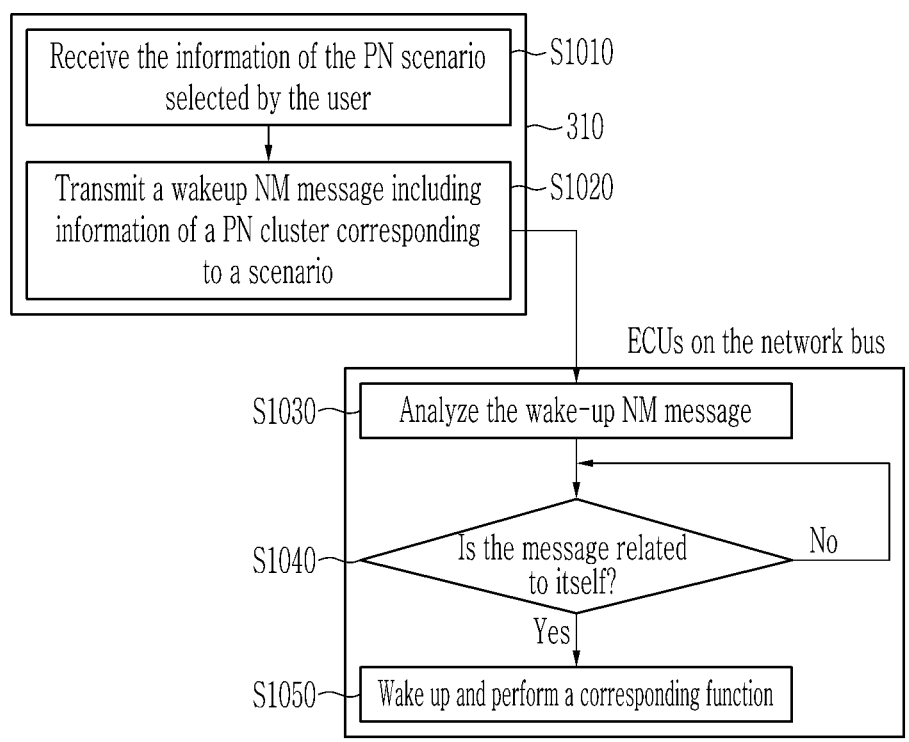
FIG. 10 is a flowchart illustrating a method of activating a PN cluster according to an embodiment.

FIG. 10 is a flowchart illustrating a method of activating a PN cluster according to an embodiment.

Referring to FIG. 10, a user accesses a PN scenario list provided through an AVN/mobile application. In this case, the PN scenario list may include new PN scenarios added through FIG. 5 or FIG. 9 as well as default PN scenarios.

The user selects one PN scenario from the list of PN scenarios, for example.

When the PNC manager 320 of the vehicle network management apparatus 300 receives the information of the PN scenario selected by the user (S1010), the PNC manager 320 transmits a wake-up NM message including information of a PN cluster corresponding to a scenario through a network bus so that only the ECUs of the PN cluster corresponding to the PN function according to the selected PN scenario are woken up (S1020).

ECUs on the network bus analyze the wake-up NM message received through the PN-supporting CNA transceiver (S1030).

As a result of analysis, the ECUs on the network bus check whether the message is related to itself (S1040).

ECUs on the network bus wake up and perform a corresponding function if the received wake-up NM message is related to itself (S1050). ECUs may determine whether a received wake-up NM message is a message related to itself, based on PN cluster information included in the wake-up NM message and PN cluster setting information in the NM function module. For example, when the PN cluster information included in the wake-up NM message indicates PNC4 and PNC4 is set in the PN cluster setting information in the NM function module, the ECU may determine that the received wake-up NM message is a message related to itself.

In addition, the wake-up ECUs may enter the sleep mode if the wake-up NM message is not received for a set timer time.

Figure 11:
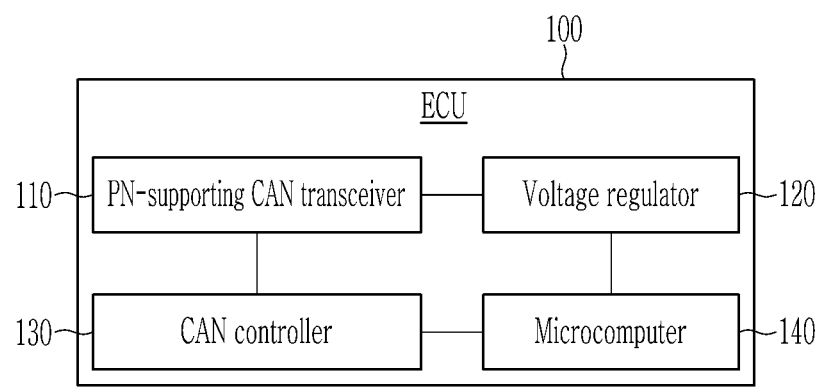
FIG. 11 is a block diagram illustrating an ECU according to an embodiment.

FIG. 11 is a block diagram illustrating an ECU according to an embodiment.

Referring to FIG. 11, the ECU 100 includes a PN-supporting CAN transceiver 110, a voltage regulator 120, a CAN controller 130, and a microcomputer 140.

The PN-supporting CAN transceiver 110 may be configured to wake up when a wake-up NM message is received through the network bus, and if the wake-up of the microcomputer 140 is required, the PN-supporting CAN transceiver 110 transmits inhibit (inhibit) signal to the voltage regulator 120 to wake up the microcomputer 140.

Upon receiving the INH signal, the voltage regulator 120 wakes up the microcomputer 140 by applying power to the microcomputer 140.

The CAN controller 130 analyzes the wake-up NM message transmitted from the PN supporting CAN transceiver 110 and determines whether the message is related to the corresponding ECU. The CAN controller 130 transmits the wake-up NM message to the microcomputer 140 if the wake-up NM message is a message related to the corresponding ECU.

The microcomputer 140 wakes up by receiving power from the voltage regulator 120 and operates in a normal mode. The microcomputer 140 may process the wake-up NM message transmitted through the CAN controller 130.

According to an embodiment, the microcomputer 140 processes an OTA software update of a user's vehicle. The microcomputer 140 may change the PN cluster setting in the NM function module through the OTA software update of the vehicle.

In addition, the PN-supporting CAN transceiver 110 may switch the mode of the microcomputer 140 to a sleep mode through the voltage regulator 120 when the wake-up NM message is not received for a set time.

As described above, according to embodiments of the present disclosure, the most efficient energy saving effect may be provided and user convenience may be maximized through a user-customized PN cluster configuration in addition to the default PN cluster that is configured and provided by default.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teachings. The embodiments were chosen and described to explain certain principles of the present disclosure and their practical application, to enable others skilled in the art to make and utilize various embodiments of the present disclosure, as well as various alternatives and modifications thereof. It is intended that the scope of the present disclosure be defined by the Claims appended hereto and their equivalents.

What is claimed is:

1. A method for managing a vehicle network in a vehicle network management apparatus, the method comprising:
based on information of at least one default partial network cluster including at least one ECU among a plurality of ECUs in the vehicle network management apparatus, according to at least one default partial network function provided by default in a mapping database, configuring a new partial network cluster by adding at least one of the ECUs according to user customization to the at least one default partial network cluster; and
storing information of the new partial network cluster in the mapping database,
wherein the configuring comprises:
receiving, from a user, information on the at least one default partial network function to be changed among the at least one default partial network function;
receiving information on a new function to be added from the user; and
configuring the new partial network cluster by adding at least one of the ECUs designated for the new function to be added to the at least one default partial network cluster for the at least one default partial network function to be changed.

2. The method of claim 1, further comprising requesting a change in a partial network cluster setting of ECUs included in the new partial network cluster through an over-the-air (OTA) software update from an OTA server.

3. The method of claim 1, wherein the storing information of the new partial network cluster in the mapping database comprises:
storing the information of the new partial network cluster in an address location allocated as reserve in a memory area of the mapping database; and
requesting a change in a partial network cluster setting through data detection at the address location allocated as a reserve.

4. The method of claim 3, further comprising requesting a change in a partial network cluster setting of ECUs included in the new partial network cluster through an over-the-air (OTA) software update from an OTA server.

5. The method of claim 1, further comprising:
deactivating one of the default partial network clusters included in the new partial network cluster.

6. The method of claim 5, further comprising requesting a change in a partial network cluster setting of ECUs included in the new partial network cluster through an over-the-air (OTA) software update from an OTA server.

7. The method of claim 1, wherein the storing information of the new partial network cluster in the mapping database comprises storing the information of the new partial network cluster in an address location allocated as reserve in a memory area of the mapping database.

8. The method of claim 7, further comprising requesting a change in a partial network cluster setting of ECUs included in the new partial network cluster through an over-the-air (OTA) software update from an OTA server.

9. A method for managing a vehicle network in a vehicle network management apparatus, the method comprising:
  based on information of at least one default partial network cluster including at least one ECU among a plurality of ECUs in the vehicle network management apparatus, according to at least one default partial network function provided by default in a mapping database, configuring a new partial network cluster by adding at least one of the ECUs according to user customization to the at least one default partial network cluster; and
  storing information of the new partial network cluster in the mapping database,
  wherein the configuring comprises:
    generating a new partial network function recommendation list including at least one new partial network function and recommending the new partial network function to a user;
    receiving information on a new partial network function selected from the new partial network function recommendation list from the user; and
    configuring the new partial network cluster based on the received information of the new partial network function selected by the user.

10. The method of claim 9, wherein generating the new partial network function recommendation list comprises:
  extracting a new partial network function optimized for the user using a user pattern analysis result through big data analysis; and
  adding the new partial network function optimized for the user to the new partial network function recommendation list.

11. The method of claim 9, wherein generating the new partial network function recommendation list comprises:
  extracting the at least one new partial network function having a high preference weighting using an analysis result of configuration information of new partial network clusters according to user customization of a plurality of users; and
  adding the at least one new partial network function having the high preference weighting to the new partial network function recommendation list.

12. The method of claim 9, further comprising requesting a change in a partial network cluster setting of ECUs included in the new partial network cluster through an over-the-air (OTA) software update from an OTA server.

13. The method of claim 9, wherein the storing information of the new partial network cluster in the mapping database comprises storing the information of the new partial network cluster in an address location allocated as reserve in a memory area of the mapping database.

14. The method of claim 13, wherein the storing information of the new partial network cluster in the mapping database further comprises requesting a change in a partial network cluster setting through data detection at the address location allocated as a reserve.

15. The method of claim 9, further comprising deactivating a default partial network cluster included in the new partial network cluster.

16. A vehicle network management apparatus for managing at least one vehicle network including at least one electronic control unit (ECU) among a plurality of ECUs in a vehicle, the apparatus comprising:
  a mapping database configured to store information of at least one default partial network cluster including at least one ECU among the plurality of ECUs according to at least one default partial network function provided by default; and
  a microprocessor programmed to execute instructions of a program to:
    create a new partial network cluster by adding an ECU according to user customization to the at least one default partial network cluster;
    store information of the new partial network cluster in the mapping database;
    generate a new partial network function recommendation list including at least one new partial network function;
    provide the new partial network function recommendation list to a user; and
    configure the new partial network cluster based on information on a new partial network function selected by the user.

17. The apparatus of claim 16, wherein the microprocessor is programmed to execute instructions of the program to request a partial network cluster setting change of ECUs included in the new partial network cluster through an over-the-air (OTA) software update from an OTA server.

18. The apparatus of claim 16, wherein the microprocessor is programmed to execute instructions of the program to extract the new partial network function optimized for the user using a user pattern analysis result through big data analysis, and to add the new partial network function optimized for the user to a new PN function recommendation list.

19. The apparatus of claim 16, wherein the microprocessor is programmed to execute instructions of the program to extract the new partial network function having a high preference weighting using an analysis result of configuration information of new partial network clusters according to user customization of a plurality of users, and to add the new partial network function having the high preference weighting to the new partial network function recommendation list.

20. The apparatus of claim 16, wherein the microprocessor is programmed to execute instructions of the program to deactivate a default partial network cluster included in the new partial network cluster.

* * * * *